March 8, 1966  W. M. HULAK  3,239,116
MAT FEATHERING METHOD
Original Filed March 19, 1964  7 Sheets-Sheet 2

INVENTOR.
WILLIAM M. HULAK
BY
ATTORNEYS

March 8, 1966  W. M. HULAK  3,239,116
MAT FEATHERING METHOD
Original Filed March 19, 1964  7 Sheets-Sheet 3

INVENTOR.
WILLIAM M. HULAK
BY
ATTORNEYS

March 8, 1966     W. M. HULAK     3,239,116
MAT FEATHERING METHOD
Original Filed March 19, 1964     7 Sheets-Sheet 4
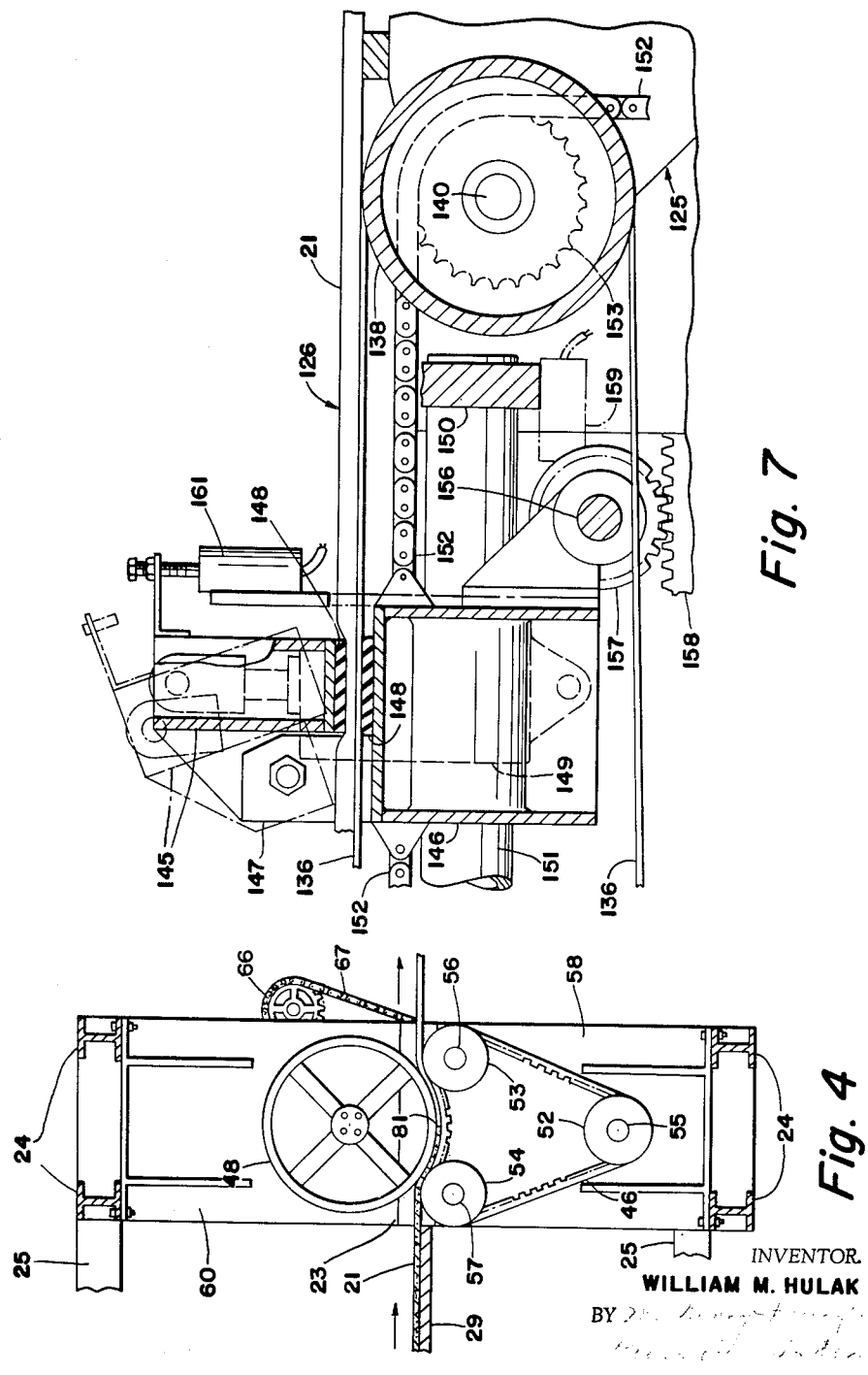
INVENTOR.
WILLIAM M. HULAK
BY
ATTORNEYS

BEST AVAILABLE COPY

March 8, 1966     W. M. HULAK     3,239,116
MAT FEATHERING METHOD

Original Filed March 19, 1964     7 Sheets-Sheet 5

INVENTOR.
WILLIAM M. HULAK
BY

ATTORNEYS

March 8, 1966   W. M. HULAK   3,239,116
MAT FEATHERING METHOD

Original Filed March 19, 1964   7 Sheets-Sheet 6

INVENTOR.
WILLIAM M. HULAK
BY
ATTORNEYS

BEST AVAILABLE COPY

March 8, 1966     W. M. HULAK     3,239,116
MAT FEATHERING METHOD
Original Filed March 19, 1964     7 Sheets-Sheet 7

INVENTOR.
WILLIAM M. HULAK
BY

ATTORNEYS 3,239,116
MAT FEATHERING METHOD
William M. Hulak, Ravenna, Ohio, assignor to Structural Fibers, Inc., Chardon, Ohio, a corporation of Ohio
Original application Mar. 19, 1964, Ser. No. 353,096, now Patent No. 3,172,590, dated Mar. 9, 1965. Divided and this application Dec. 1, 1964, Ser. No. 425,654
1 Claim. (Cl. 225—3)

This application is a division of application Serial No. 353,096, filed March 19, 1964, now Patent No. 3,172,590.

The present invention relates generally to the preparation of fiber matting for use in the manufacture of a wide variety of fiber-reinforced plastic articles, such as molded plastic sheets, tubes, containers, and tanks, which are fabricated by laying up porous, fibrous mats approximately in the shape of the article to be produced and impregnating the fibrous matting sheets with a liquid resin which is thereafter cured or set to achieve a molded, substantially homogeneous structure.

This invention is particularly concerned with the production of fiber-reinforced, plastic, pressure vessels and tanks, such as domestic water softener tanks and hot water tanks, which are subjected to pressures of considerable magnitude and thus are required to have a high bursting strength. Accordingly, the main objective of the invention is to provide a method which facilitates the fabrication process generally described above in a manner which makes it possible to manufacture seamless, leakproof tanks and similar articles of unexpectedly improved strength.

A more specific and preferred procedure which may be employed for fabricating articles of the type described is generally set forth in the copending application of Arthur J. Wiltshire, Serial No. 63,082, filed October 17, 1960, now Patent No. 3,177,105, and includes the steps of wrapping a plurality of superimposed, flat sheeting mats in a single turn around an expandable mandrel to form a multilayer, cylindrical, matting form. The flat sheeting mats used in this process are preferably constructed of randomly distributed, chopped glass fibers of substantially uniform lengths which are bonded together by suitable cured binders to form a porous, fibrous mat. Mats of this type are well known in the art and are commercially available in standard widths. In accordance with the practice described in the above-identified copending application, the wrapped sheets of matting have a width substantially equal to the circumference of the finally molded tank and have opposite end edges correspondingly feathered or beveled in parallel planes from opposite sides of the mats, each mat being wrapped around the mandrel so that one feathered end edge loosely overlaps the body of the mat adjacent the other feathered end edge.

Having laid up the fibrous sheets of mats around the mandrel in the foregoing manner, the mandrel is axially positioned within an open end, cylindrical mold casing and then expanded to position and compress the cylindrical matting form against the inner surface of the mold casing. As this expansion of the cylindrical matting form takes place, the overlapped ends of each mat are drawn apart until the feathered end edges slide into mating juxtaposition so that the fibers of the matting are uniformly distributed and compacted over the inner mold surface. Thereupon, the mandrel is contracted and removed from within the mold casing and is replaced by a fluid-expandable bag having an expanded shape conforming to the desired shape of the molded tank. Alternately, the expandable mandrel may be left in place and used as a substitute for the inflatable bag.

As disclosed in the above-identified Wiltshire application, the next step in molding closed end tanks has been to telescope preformed fiber matting pieces or caps onto the upper and lower ends of the positioned, cylindrical, matting form. The open end casing is then closed by mold casing caps having the general configuration of the preformed fiber matting pieces or caps. With the matting forms and bags thus assembled within the closed mold, the bag is initially expanded to bring it into contact over its entire surface with the inner surface of the laid-up matting form. Liquid resin, which may be any resin settable by heat, a catalyst, or both, is then introduced into the bottom of the mold and caused to permeate the fiber matting forms. The bag is subsequently expanded by further inflation to progressively compress the fiber matting forms in such a manner as to distribute the resin throughout the matting and express resin from the mold, whereupon the resin is set or cured while maintaining maximum bag pressure. The resulting, finished, molded article is a substantially closed, hollow tank of the character described and claimed in Donald W. Randolph Patent No. 3,010,602.

It has been found that, when a discontinuity exists in the molded article, as for example between the longitudinal edges of the cylindrically wrapped matting form and/or between the ends of the cylindrical matting form and the fiber end caps, the strength of the tank is adversely affected. One reason for this detrimental effect is thought to be that the fiber:resin ratio in the areas of the discontinuities is less than in other portions of the article. As a result, a resin-rich and structurally weak region is created which is subject to leakage and failure and which has a different modulus of elasticity than the rest of the tank structure and, therefore, contributes to localized concentrations of flexure stresses causing fatigue failures. Another reason is thought to be that, when the discontinuities are formed by overlapped mat edges, the edges create stress risers, which result in premature failure. This latter defect has been exhibited by water softener tanks which are normally subjected to fluctuating internal pressures. Such tanks have been found to fail in circumferential zones located at the points where the fiber end caps were telescoped into the ends of the cylindrical matting form and then repeatedly expanded radially outwardly over the end edges of the matting forms by the pressure variations in the tanks.

In order to overcome the foregoing difficulties, it has been found advantageous to bevel or feather mating edges of the fibrous mats so that they blend into each other instead of creating a sharp line of demarcation and a resultant seam in the molded article. This practice is illustrated in the above-identified Wiltshire application, wherein the longitudinal edges of the mats making up the wrapped, cylindrical form are feathered so that these edges of each mat blend into one another when the matting form is positioned and compressed against the inner mold surface.

Apparatus for continuously separating a continuous strip of mat into matting forms having opposite, feathered edges is set forth in the copending application of Arthur J. Wiltshire and Richard C. Brussee, Serial No. 98,617, filed March 27, 1961, now Patent No. 3,133,684. As is set forth more fully in that application, the apparatus includes means to form separated mat sections having two opposite feathered edges. These feathered edges are formed across the width of the continuous matting strip and form top and bottom seams in a finished cylindrical tank.

These matting sections, therefore, have two feathered edges as they are fed from the machine. Since, as is set forth in the copending application of Wiltshire, Serial No. 63,082, it is desirable to feather all of the mating edges of mat sections, these sections may be reinserted in the machine for further feathering operations.

The reinsertion of the partially feathered mat sections into the machine, however, involves a modification of the machine and operation of the machine on a piece-by-piece basis. The present invention is an improvement to the machine set forth in the above-identified application of Wiltshire and Brussee, so that it may be operated on a continuous basis to feather three edges of the mat section. While it is highly desirable to feather all of the edges of a mat section, as was indicated above, acceptable tanks may be produced by feathering three edges.

An object of the present invention is to provide a method for feathering the edges of porous, fibrous mats to facilitate the improved fabricating process described above.

Another object of the invention is to provide a method for longitudinally separating and feathering a strip of fibrous matting material and then pulling mat sections of variable lengths from the separated strip to provide mat sections having three uniformly feathered edges.

As noted above, the matting material which is used in the fabrication of fiber-reinforced articles of the type described consists of a mass of randomly distributed fibers of substantially uniform length. In accordance with the present invention, apparatus is provided which includes means to longitudinally separate into longitudinal sections and feather a continuous strip of matting material and which apparatus includes cooperating transversely extending clamps, each of which has relatively movable platens for grippingly engaging the longitudinally separated and feathered matting material. The transversely extending clamps are relatively movable from a clamping position in which they are parallel to each other and spaced apart a distance slightly exceeding the fiber lengths of the material, to a second position in which they are parallel to each other and spaced a greater distance apart. Relative movement of these clamps from the clamping position to the second position is effective to pull apart and separate the longitudinally extending mat sections so as to leave the adjacent, separated transverse edges thereof in the desired, feathered condition.

The novel construction of the apparatus comprising the invention is such that all of the pulling means grip the matting material with a uniform pressure. Because of this construction, the pulled apart edges of the matting will be uniformly feathered as the mat is separated.

The invention also includes means for feeding a continuous strip of mat through the machine in accordance with the amount of mat required at the clamping and pulling station, so that the longitudinal and transverse feathering operations may be performed in a continuous manner.

Other objects and advantages of the invention will become apparent from the following detailed description and from the accompanying drawings.

In the drawings:

FIGURE 4 is a cross-sectional view of the apparatus, the plane of the section being indicated by the line 4—4 in FIGURE 2;

FIGURE 7 is an enlarged, fragmentary, side elevational view in cross section of a portion of the apparatus illustrated in FIGURE 1a;

FIGURE 8 is a sectional view of the apparatus, the plane of the section being indicated by the line 8—8 in FIGURE 1a;

FIGURE 9 is a sectional view of the apparatus, the plane of the section being indicated by the line 9—9 in FIGURE 1a;

FIGURE 10 is a sectional view of the apparatus, the plane of the section being indicated by the line 10—10 in FIGURE 1a.

Figure 1A:
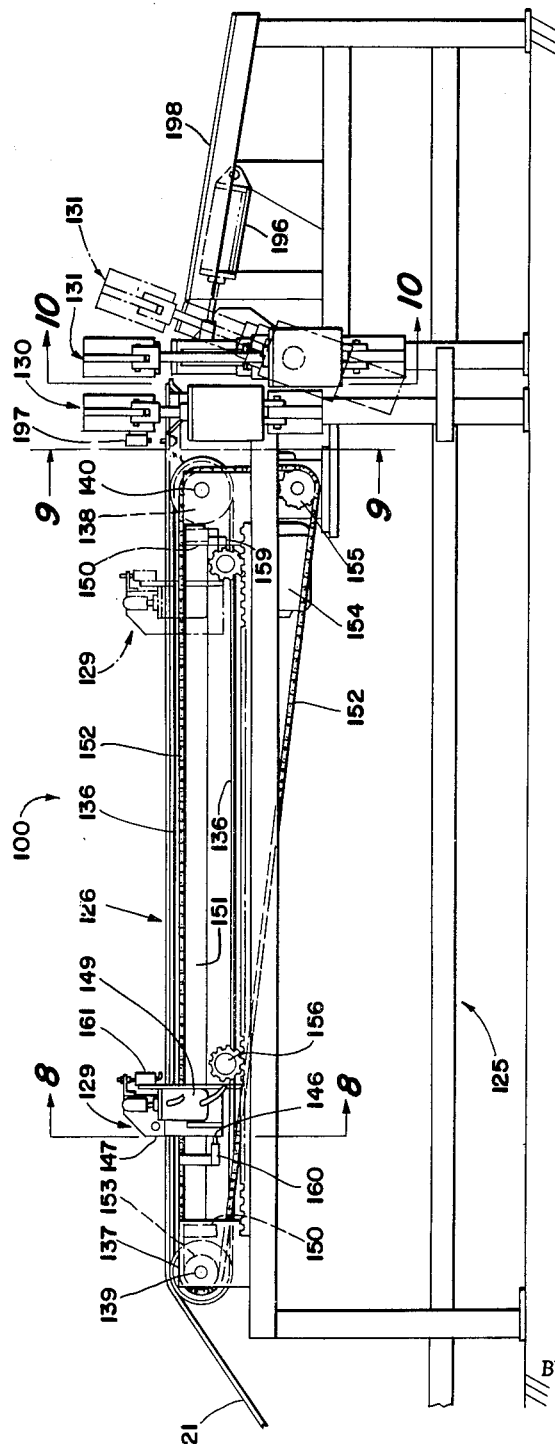
FIGURE 1a is a side elevational view of one portion of the apparatus comprising the present invention.
Figure 1B:
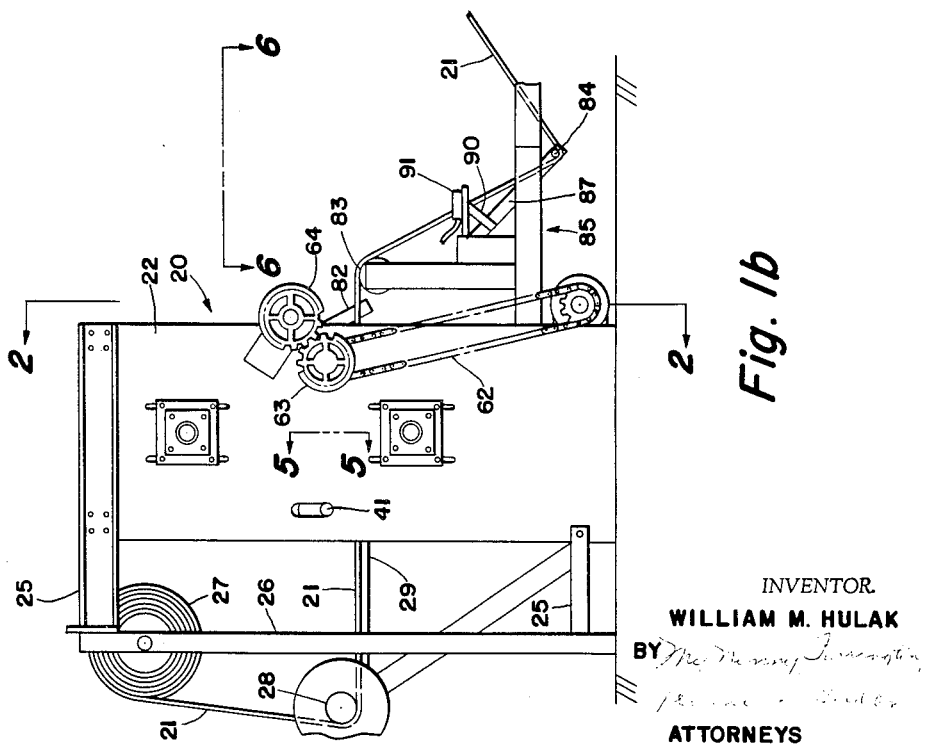
FIGURE 1b is a side elevational view of another portion of the apparatus comprising the present invention.

Referring now to the drawings and particularly to FIGURES 1a and 1b, an apparatus is shown for pulling apart a strip of the above-described matting into mat sections having uniformly feathered or beveled, pulled-apart edges. In operation, the apparatus may be used for the dual purpose of forming matting sections of the proper size to be wrapped into cylindrical form for the previously described fabricating process and for feathering three edges of these mat sections on a continuous basis.

Figure 2:
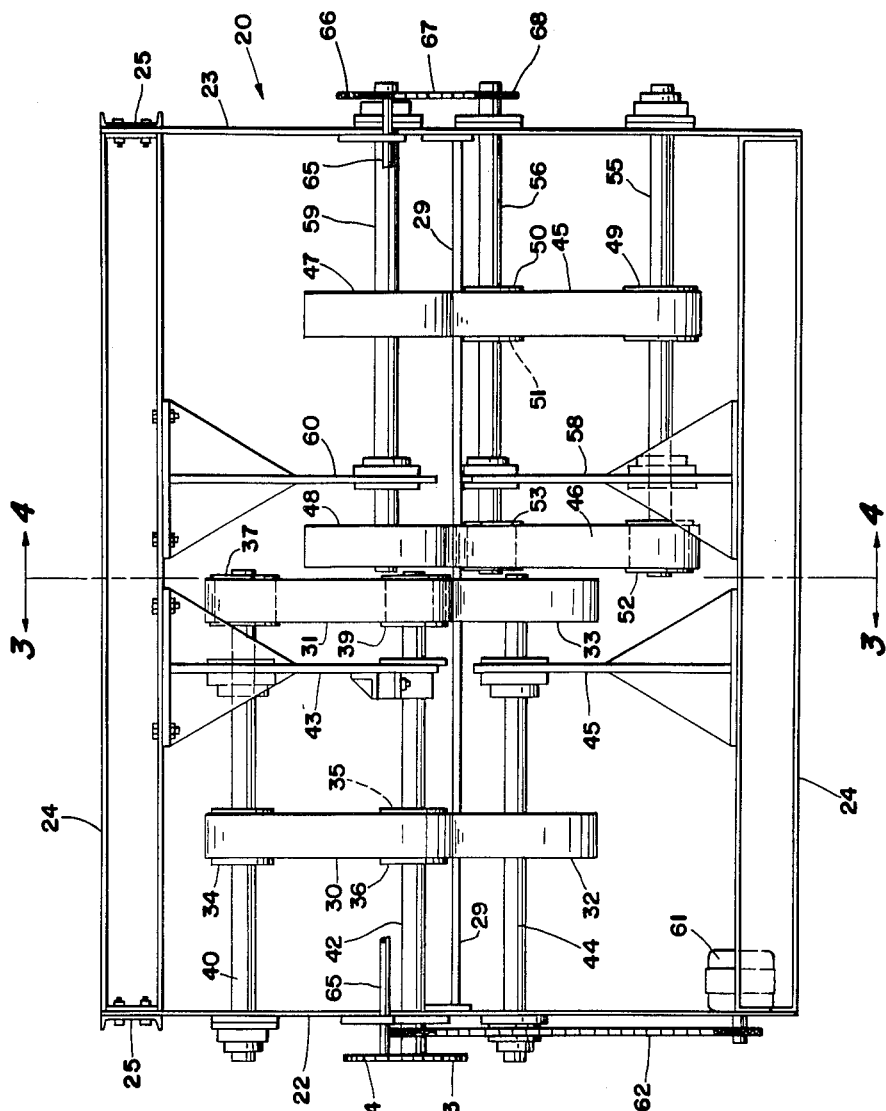
FIGURE 2 is a cross-sectional view of the apparatus, the plane of the section being indicated by the line 2—2 in FIGURE 1b.
Figure 5:
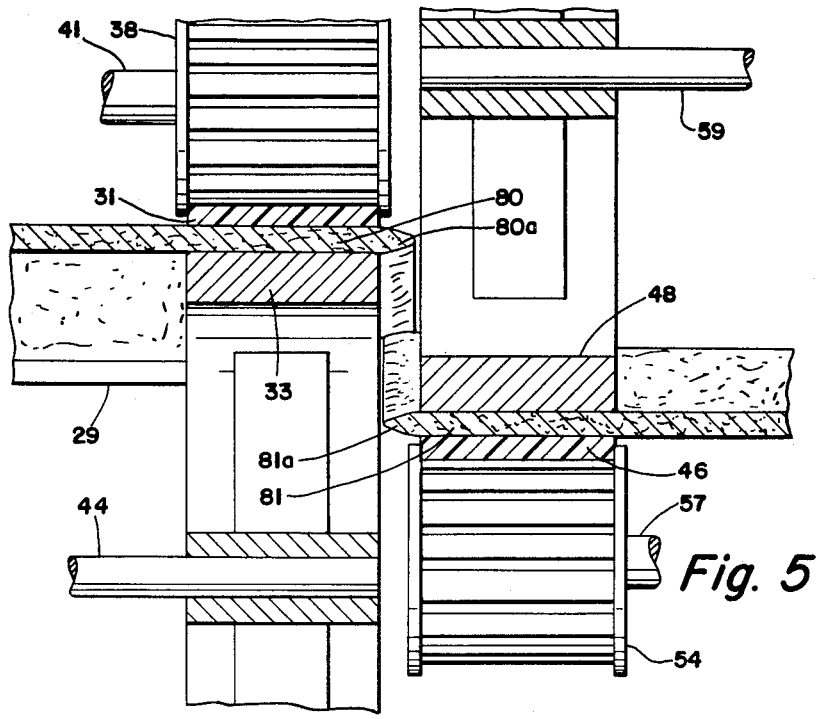
FIGURE 5 is an enlarged, fragmentary, sectional view of the longitudinal separating mechanism, the plane of the section being indicated by the line 5—5 in FIGURE 1b.

As is shown in FIGURES 1b and 2, the apparatus for forming mat sections having feathered, pulled-apart, end edges comprises a machine portion 20 for longitudinally separating and feathering a strip of matting 21. The machine portion 20 includes spaced apart, vertical, side plates 22 and 23 which are secured at their top and bottom ends by cross beams 24. Frame members 25 extend from the side plates 22 and 23 and support a pair of vertical columns 26. The strip of matting 21 is initially wound in a roll 27 which is mounted between the vertical columns 26. The matting 21 is trained under an idler roll 28 and onto a flat table 29 which extends outwardly from the side plates 22 and 23.

The strip of matting 21 is fed through the machine portion 20 by a belt and drum wheel arrangement. This arrangement includes a first pair of timing belts 30 and 31 and a cooperating pair of drum wheels 32 and 33. The belt 30 is trained around pulleys 34, 35, and 36, and the belt 31 is trained around pulleys 37, 38, and 39. Three pairs of pulleys, which respectively comprise the pulleys 34 and 37, 35 and 38, and 36 and 39, are respectively mounted on shafts 40, 41 and 42. The shafts 40, 41, and 42 are journaled for rotation between the side plate 22 and an intermediate plate 43.

As may be seen most clearly in FIGURE 2, the drum wheels 32 and 33 are fixed to a shaft 44 which is journaled for rotation between the side plate 22 and an intermediate plate 45. The drum wheels 32 and 33 respectively bear against the belts 30 and 31, and, as may be seen in FIGURE 3, the wheels 32 and 33 push the belts upwardly so that the belts and drum wheels define arcuate paths between the pulleys 35 and 36 and between the pulleys 38 and 39.

The belt in drum wheel arrangement further includes a second pair of belts 45 and 46 and a cooperating pair of drum wheels 47 and 48. The belt 45 is trained around pulleys 49, 50, and 51, and the belt 46 is trained around pulleys 52, 53, and 54 (FIGURE 4). Three pairs of pulleys, which respectively comprise the pulleys 49 and 52, 50 and 53, and 51 and 54, are respectively mounted on shafts 55, 56, and 57 (FIGURE 4.) The shafts 55, 56, and 57 are journaled for rotation between the side plate 23 and an intermediate plate 58.

As also shown most clearly in FIGURE 2, the drum wheels 47 and 48 are fixed to a shaft 59 which is journaled for rotation between the side plates 23 and an intermediate plate 60. The drum wheels 47 and 48 respectively bear against the belts 45 and 46, and, as may be seen in FIGURE 4, the wheels 47 and 48 push the belts downwardly so that the belts and drum wheels define arcuate paths between the pulleys 50 and 51 and between the pulleys 53 and 54.

Figure 3:
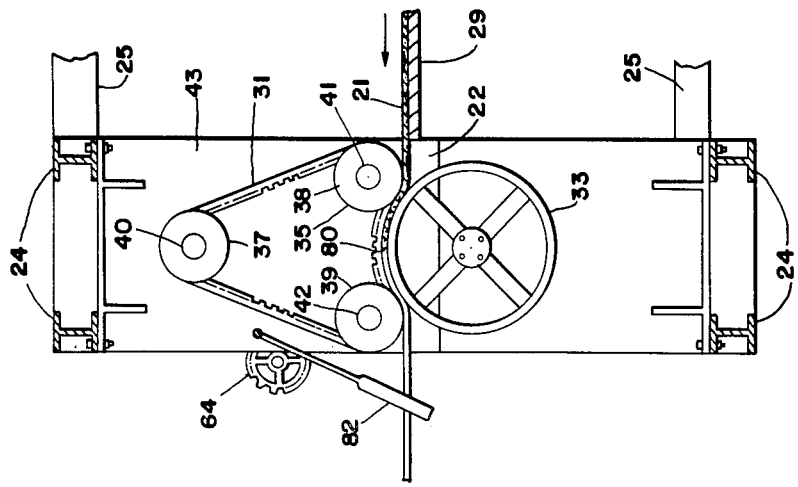
FIGURE 3 is a cross-sectional view of the apparatus, the plane of the section being indicated by the line 3—3 in FIGURE 2.

The belts 30, 31, 45, and 46 are driven to advance the matting 21 in the direction of the arrows in FIGURES 3 and 4 by a motor 61. The motor 61 drives the shaft 42 and, therefore, the belts 30 and 31 through a chain 62. A spur gear 63 is mounted on the end of the shaft 42 and is in engagement with an identical spur gear 64 which is mounted on the end of a shaft 65. The shaft 65 extends across the machine to the side plate 23 and drives the shaft 56 through a spur gear 66 which is mounted on the other end of the shaft 65 in driving relationship with a chain 67 and an identical spur gear 68 which is mounted on the end of the shaft 56.

As may be seen in FIGURES 2, 3 and 4, the wheel drums 32, 33, 47, and 48 are idler wheels that are driven by their engagement with the mat 21. As the mat passes through the machine portion 20, a first longitudinal portion 80 of the mat 21 follows an upwardly curved arcuate path with respect to the plane of the table 29, and a second longitudinal portion 81 of the mat 21 follows a downwardly curved, arcuate path with respect to the plane of the table 29. As these portions 80 and 81 follow their diverse paths, they are separated from each other and thereby provided with uniformly feathered end edges 80a and 81a, respectively. A blade 82 (FIGS. 1b and 3) is provided at the outfeed end of the portion 20 to insure that these portions have been completely separated.

Figure 6:
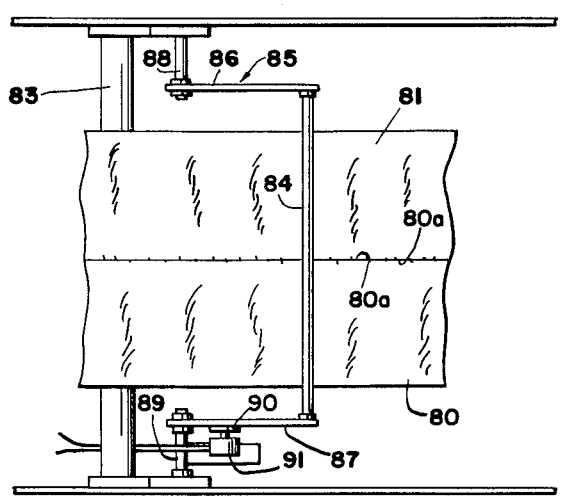
FIGURE 6 is a plan view of a portion of the apparatus, the plane of the section being indicated by the line 6—6 in FIGURE 1b.

A longitudinally separated and uniformly feathered mat 21, which comprises the portions 80 and 81, is trained over a guide bar 83 at the outfeed end of the machine portion 20 and under a cross roll 84 of a loop control mechanism 85. The control mechanism 85 comprises frame members 86 and 87 which are pivotally connected to pins 88 and 89 (FIG. 6), respectively. The cross roll 84 is rotatably mounted between the free ends of the frame members 86 and 87 and rests on the mat sections 80 and 81. A cam plate 90 is fixed to the frame member 87 and engages a limit switch 91 as the cross roll 84 is raised by the mat sections 80 and 81. When the cam plate 90 strikes the limit switch 91, the motor 61 is energized to advance the mat 21 through the machine portion 20 in the previously described manner. As will hereinafter become apparent, the mat 21 is intermittently driven through the machine portion 20 when the cam plate trips the limit switch 91, and a loop is thereby maintained at the outfeed end of the machine portion 20.

Referring now to FIGURE 1a, a second portion 100 of the machine is illustrated. The machine portion 100 is employed to pull apart the longitudinal mat sections 80 and 81 into substantially uniform sections having uniformly feathered or beveled pulled-apart, transverse edges. This portion of the apparatus is fully described in the above-identified Patent No. 3,133,684, but will be briefly described below.

As shown in FIGURE 1a, the machine portion 100 comprises a frame 125 having a bed 126 for supporting the longitudinally separated mat sections 80 and 81. A feeding clamp 129 is slidably connected to the frame 125 for feeding the mat sections to a pair of clamps 130 and 131 connected to the frame at the other end of the bed 126.

The clamp 130 is fixedly secured to the frame 125 and functions to clamp and hold the matting portions fed by the feeding clamp 129. The clamp 131 is pivotally connected to the frame adjacent to the clamp 130 and is movable from a first clamping position (shown in solid line position in FIG. 1a) in which the clamps 130 and 131 are in parallel, spaced adjacency, to a second clamping position (shown in phantom outline in FIG. 1a) in which the clamps are parallel to each other and spaced a greater distance apart. Movement of the clamp 131 from its first clamping position to its second clamping position is effective to pull apart the mat sections 80 and 81 between the clamps and to uniformly feather the pulled apart transverse edges thereof.

The bed 126 comprises a plurality of endless belts 136 which have their upper surfaces in a horizontal plane. The belts 136 are horizontally spaced from each other and are mounted around a belt roller 137, which is adjacent the loop control mechanism 85, and a corresponding roller 138 adjacent the clamp 130. Both rollers are freely rotatable on shafts 139 and 140, respectively, which are mounted on the frame 125.

Figure 8:
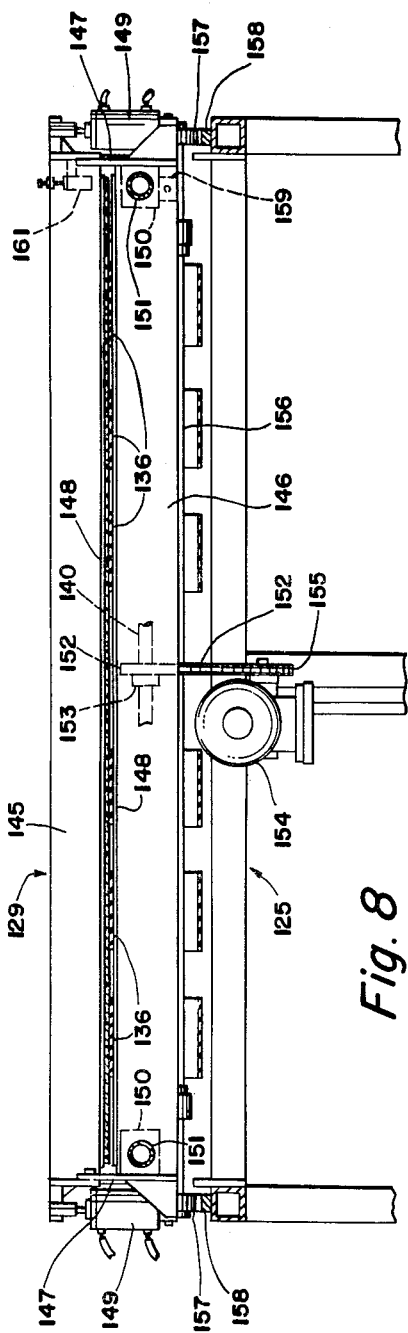

The feeding clamp 129 is formed by an upper platen 145 and a lower platen 146 which are movable toward and away from each other. The lower platen 146 extends from one side of the frame 125 to the other side thereof between the upper and lower reaches of the belts 136, and has secured to each of its ends a plate 147 which projects upwardly above the belts. As shown most clearly in FIGURE 8, the upper platen 145 is pivotally connected to these plates 147 so that it may be rocked toward the lower platen 146 to clamp the mat 21 therebetween. Preferably, the cooperating clamping surfaces of the platens are provided with soft rubber pads 148 so that the glass fibers of the mat sections will not be broken.

Rocking movement of the upper platen 145 is effected by double acting fluid cylinders 149. Each of the cylinders 149 is secured to an end of the lower platen 146 and has its piston rod connected to the upper platen 145.

The ends of the lower platen 146 are provided with bearing blocks 150 which slidably support the entire feeding clamp on the bars 151 which extend along the sides of the frame 125. Sliding movement of the feeding clamp 129 along the bars 151 is effected by a chain 152 which has one end connected to the front surface of the lower platen 146 and its other end connected to the rear surface of the lower platen. The chain 152 is engaged around sprocket gears 153 fixed to the shaft 139 and 140 and is driven by a reversible motor 154 which is mounted on the frame 125 below the shaft 140 and which drives another sprocket gear 155 also engaged with the chain.

In order to prevent the feeding clamp 129 from cocking as it is slid along the bars 151, the clamp 129 is provided with a shaft 156 which is rotatably connected to a front of the lower platen 146. A rack gear 157 is fixed on each end of the shaft 156, and these rack gears cooperate with racks 158 mounted on the frame 125 below the bars 151.

The fluid cylinders 149 and the motor 154 are in circuit relation with a pair of limit switches 159 and 160 mounted on one of the bars 151 and with a limit switch 161 operatively mounted between the platens 145 and 146. The switches 159 and 160 are respectively located in front and in back of the feeding clamp 129 so that they will be alternately actuated when the feeding clamp reaches the end of its travel in one direction. The switch 161 is mounted on the feeding clamp so that it will be closed when the upper platen is rocked into a clamping position.

In operation, the fluid cylinders 149 are actuated to clamp the mat sections 80 and 81 and the belts 136 between the platens 145 and 146 when the feeding clamp is in its rear position shown in FIGURE 1a. This clamping action closes the limit switch 161 which starts the motor 154. The motor 154 operates to pull the feed clamp forwardly until it is in the position illustrated in phantom outline in FIGURE 1a. Forward movement of the feed clamp serves to feed the mat sections 80 and 81 toward the clamps 130 and 131.

When the feed clamp reaches its forward position, the switch 159 is contacted and closed. This stops the motor 154 and causes the fluid cylinders 149 to be actuated to open the feed clamp 129 and the switch 161. Thereupon the motor 154 is actuated to reverse the movement of the feed clamp and draw it back to its rear position. Reverse movement of the feed clamp brings it into contact with the switch 160 which, when closed, again stops the motor 154. Closure of the switch 160 is also effective to again actuate the cylinders 149 so that the mat sections 80 and 81 and the belts 136 are clamped between the platens 145 and 146, thus completing one cycle of operation and initiating the next cycle.

In the illustrated embodiment of the apparatus, the limit switch 159 is adjustably connected to the bars 151 so that the amount of travel of the feed clamp 129 can be varied. Thus, when pulling mat sections which are to be laid up to form the cylindrical bodies of pressure tanks, the limit switch 159 can be adjusted toward or away from the limit switch 160 so that the feed clamp 120 moves a distance in one direction substantially equal to the length of the tanks to be formed.

Figure 9:
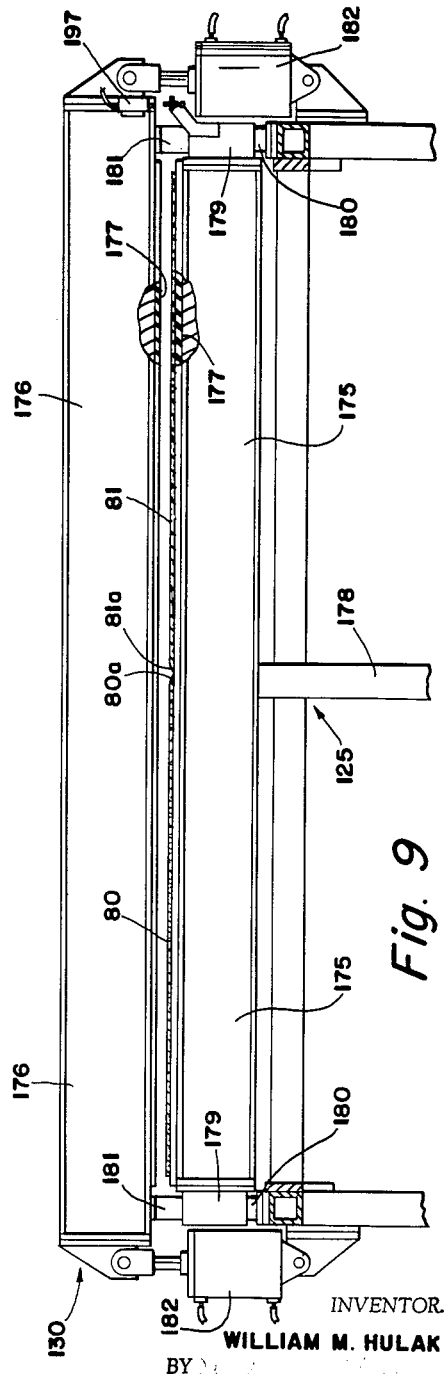
Figure 10:
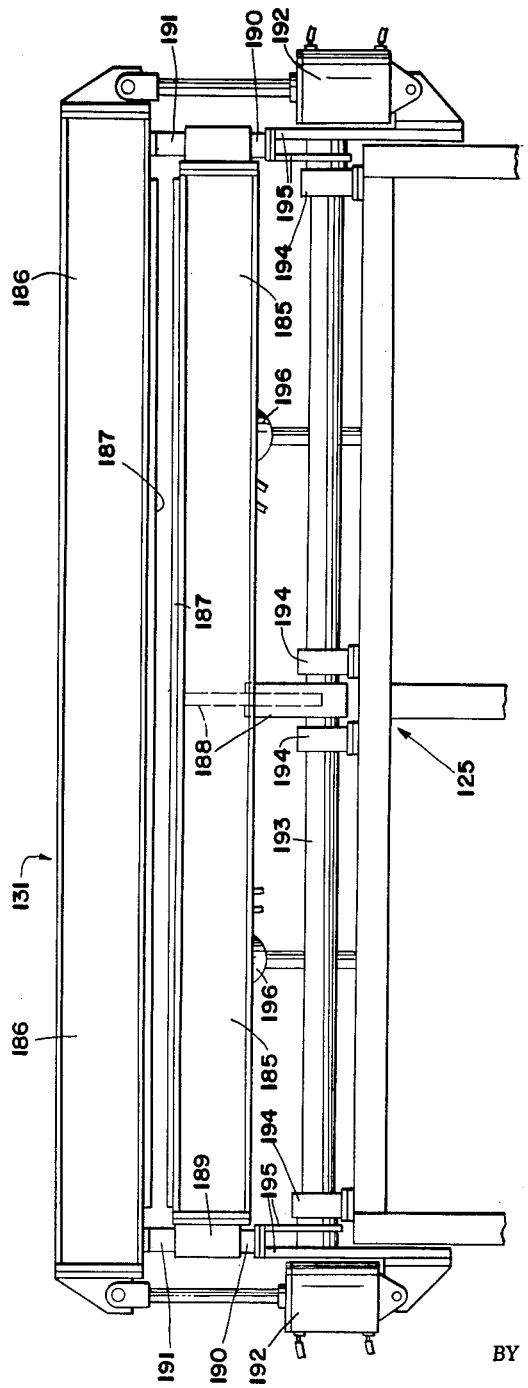

Reference is now made to FIGURES 9 and 10 which show the detailed construction of the clamps 130 and 131.

Each clamp 130 and 131 respectively includes a lower platen 175 and 185 and an upper platen 176 and 186. The upper platens are only slightly longer than the lower platens and are movable toward the lower platens to clamp the mat sections 80 and 81 which are positioned therebetween by the feed clamp 129. The clamps 130 and 131 are preferably provided with soft rubber pads 177 and 187, respectively, on the clamping faces of the upper and lower platens to avoid damaging the glass fibers of the matting strip.

As shown most clearly in FIGURE 9, the lower platen 175 of the clamp 130 is rigidly connected at its center to its frame 125 by a brace 178. The ends of the lower platen 175 are provided with knife guides 179 for guidingly receiving the blades 180 which are secured to the sides of the frame 125 to extend into the bottom of the guides. The upper platen 176 is provided with oppositely extending blades 181 which are guidingly received in the tops of the guides 179.

Movement of the upper platen 176 toward and away from the lower platen 175 is effected by double-acting piston-cylinder mechanisms 182. The cylinders of these mechanisms 182 are fastened to the sides of the frame 125 and their piston rods are fastened to the ends of the upper platen 176. When the piston-cylinder mechanisms 182 are actuated to draw the upper platen 176 downwardly into clamping cooperation with the lower platen 175, the ends of the lower platen will deflect downwardly and the blades 180 will move upwardly in the guides 179. At the same time, the ends of the upper platen will be correspondingly deflected or bowed with the blades 181 moving downwardly in the guides 179.

Referring particularly to FIGURE 10, it will be seen that the lower platen 185 of the clamp 131 is pivotally connected at its center to the frame 125 by a brace 188 which is fixed on the pivot shaft 193. This shaft 193 is coextensive with the lower platen and is supported by bearing blocks 194 which are mounted on the frame 125.

At each end of the shaft 193 is fixed a plate 195. These plates carry double-acting piston-cylinder mechanisms 192 which have their piston rods fastened to the ends of the upper platen 186 for moving it toward and away from the lower platen 185. When the piston-cylinder mechanisms 192 are actuated to draw the upper platen 186 into clamping cooperation with the lower platen 185, the ends of both platens will be bowed downwardly in the manner discussed in connection with the clamps 130. The ends of the platens are guided for this deflecting movement by knife guides 189 which are secured to the ends of the lower platen. These guides 189 guidingly receive blades 190, which are secured to the top surface of the plates 195, and opposed blades 191 which extend downwardly from the upper platen 186 to the top ends of the guides.

As has been previously described, the clamp 131 is pivotally movable from a first clamping position of parallel, spaced adjacency to the clamp 130, to a second clamping position in which the clamps are spaced further apart. From its clamping position shown in FIGURE 1a, the clamp 131 is spaced from the clamp 130 a distance slightly exceeding the uniform fiber lengths of the mat sections 80 and 81 so that it is impossible for the clamps 130 and 131 to clamp the opposite ends of individual fibers. In its pivoted position shown in phantom outline in FIGURE 1a, the platens of the clamp 131 are adjacent a sloping table 198 which forms a part of the frame 125.

Pivoting movement of the clamp 131 is accomplished by a pair of double-acting piston-cylinder mechanisms 196. As shown most clearly in FIGURES 1a and 10, the cylinders of these mechanisms 196 are pivotally connected to the frame 125 below the table 198. The piston rods are pivotally connected to the front face of the lower platen 185.

A limit switch 197 (FIGURE 1a) is mounted on the clamp 130 in a position to be closed when the upper platen 176 is moved into clamping cooperation with the lower platen 175. This limit switch 197 is in circuit relation with the reversible motor 154, which drives the feed clamp 129, and with the piston-cylinder mechanisms 196. The previously described limit switch 159 is in circuit relation with the piston-cylinder mechanisms 182 and 192, and the limit switch 160 is in circuit relation with the piston-cylinder mechanisms 182, 192, and 196.

In operation, the previously described closure of the limit switch 161 starts the motor 154 and the feed clamp 129 is pulled forwardly to the position illustrated in phantom outline in FIGURE 1a. As the mat sections 80 and 81 are pulled through the looper mechanisms 85, the cross roll 84 is moved upwardly until the cam plate 90 strikes and closes the limit switch 91. Closure of the limit switch 91 starts the motor 61 to drive the mat 21 through the machine portion 20. It is desirable that the surface driving speeds of the drum wheel and belt arrangement in the machine portion 20 be correlated to correspond to the surface speed of the feeding clamp 129 so that a substantially constant loop length will be maintained in the mechanisms 85. When the feeding clamp 129 is in its forward position, the switch 159 is contacted and closed. This stops the motor 154 and actuates the cylinders 182 and 192 to clamp the mat sections 80 and 81 between the platens 175, 176 and 185, 186 of clamps 130 and 131, respectively. The motor 61 continues to run until the cam plate 90 leaves the limit switch 91. The clamping action of the clamps 175 and 176 closes the switch 197 which actuates the motor 154 to drive the feed clamp 129 toward the rear end of the frame 125. Closing the switch 197 also actuates the cylinders 196 to separate the clamps 130 and 131.

When the feed clamp 129 reaches the rear end of the frame and closes the switch 160, the cylinders 182 and 192 are actuated to unclamp the portions 80 and 81. Closing the switch 160 also actuates the cylinders 196 to pivotally move the clamp 131 back to its clamping position of parallel, spaced adjacency to the clamp 130.

As is more particularly pointed out in the above-identified patent to Wiltshire and Brussee, the construction of the clamps 130 and 131 permits these clamps to apply the desired, uniform, clamping pressure across the width of the mat sections 80 and 81.

Many modifications and variations of the illustrated, preferred embodiment of the invention will be apparent to those skilled in the art in light of the above disclosure. Therefore, it is to be understood that, within the scope

What is claimed is:

A method of pulling three feathered edges on a fibrous mat comprising the steps of providing a strip of fibrous matting material, longitudinally separating said fibrous matting material along the length of said strip by guiding a first longitudinal section of said material in a first direction and guiding a second longitudinal section of the mat in a second direction to thereby separate said sections and uniformly feather the separated edges thereof, and clamping a pair of matting portions across the width of each of said longitudinal sections and separating said clamped portions to pull apart the longitudinal sections and uniformly feather the pulled apart edges of said longitudinal sections.

No references cited.

WILLIAM W. DYER, Jr., *Primary Examiner.*

J. M. MEISTER, *Assistant Examiner.*